J. R. SPANGLER.
MOTOR CYCLE FRICTION CLUTCH.
APPLICATION FILED SEPT. 9, 1909.

974,839.

Patented Nov. 8, 1910.
2 SHEETS—SHEET 2.

WITNESSES

INVENTOR
Jacob R. Spangler
BY
ATTORNEYS

UNITED STATES PATENT OFFICE.

JACOB R. SPANGLER, OF NEW YORK, N. Y., ASSIGNOR TO S. D. MANUFACTURING CO., OF BROOKLYN, NEW YORK.

MOTOR-CYCLE FRICTION-CLUTCH.

974,839.      Specification of Letters Patent.    Patented Nov. 8, 1910.

Application filed September 9, 1909. Serial No. 516,845.

*To all whom it may concern:*

Be it known that I, JACOB R. SPANGLER, a citizen of the United States, and a resident of the city of New York, borough of Brooklyn, in the county of Kings and State of New York, have invented a new and Improved Motor-Cycle Friction-Clutch, of which the following is a full, clear, and exact description.

The invention has for its purpose to overcome the shock and vibration in vehicles propelled by explosive engines, more especially motor cycles, incident to the firing of the charge when the motor cycle is first started, or after it is started when the load is very heavy, as when climbing a hill. To this end I introduce within the crank casing between the crank shaft and the crank, a friction clutch, the clutch allowing the crank to slip relatively to the driving portion of the crank shaft when the strain on the driving parts caused by the impetus of the explosion exceeds a predetermined point.

Reference is to be had to the accompanying drawings forming a part of this specification, in which similar characters of reference indicate corresponding parts in both views.

Figure 1:
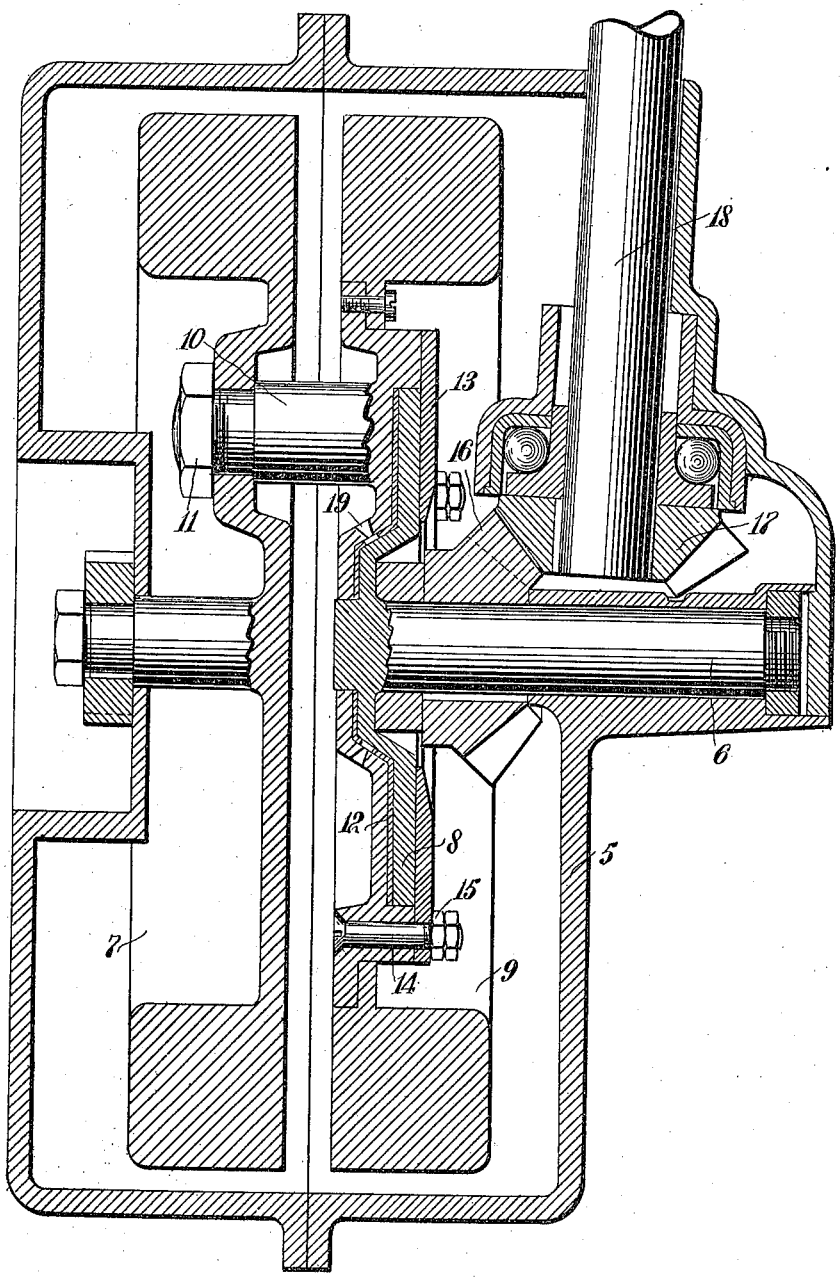
Figure 2:
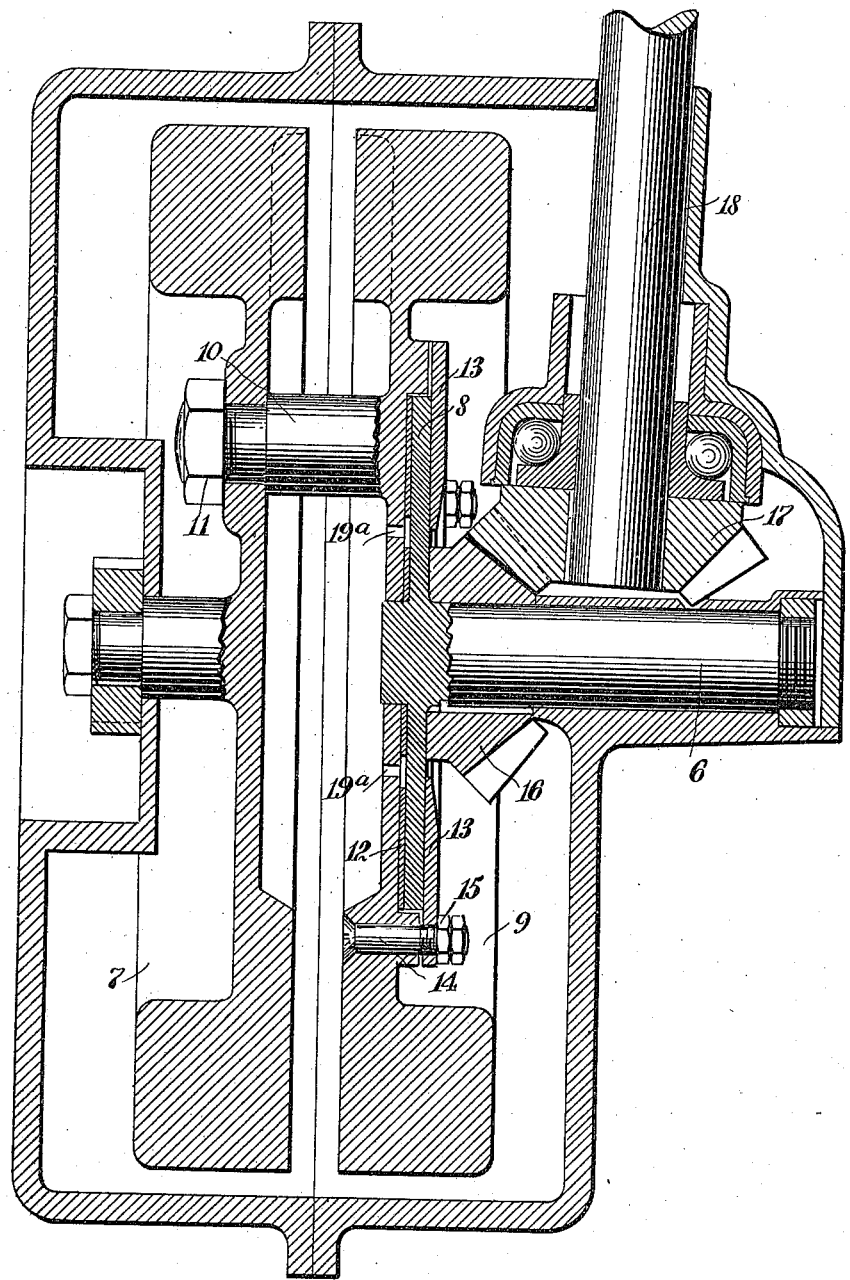

Figure 1 is a horizontal section through the crank casing of a motor cycle constructed in accordance with my invention; and Fig. 2 is a similar sectional view illustrating a modification.

A crank casing 5 of an explosive engine, such as are generally employed for driving motor cycles, is provided with a driving shaft 6 journaled in suitable bearings at the opposite sides of the casing, the driving shaft being made of two sections, one of which is integral or otherwise rigid with one-half section 7 of a fly-wheel, and the other section of the shaft rigid with a friction disk 8 and carrying the other half section 9 of the fly-wheel at the inner side of the friction disk. The two half sections of the fly-wheel are spaced apart a distance sufficient for the travel of the usual connecting-rod or pitman, and are rigidly connected together by a crank-pin 10, the latter being preferably integrally formed with the body portion of the fly-wheel section 9, and its opposite end reduced and threaded to pass through or bear against the inner face of the fly-wheel section 7, where it is provided with a nut 11. Both the body portion of the fly-wheel 9 and the friction disk 8 are dished in that form of the invention shown in Fig. 1, with the concave or recessed faces of these parts turned outwardly, and between them is placed a bronze friction plate 12 of like shape, the whole being clamped together to the desired tightness by an annular clamping-plate 13, through which and the fly-wheel section pass the clamping-bolts 14 having lock-nuts 15 at the outer end. Attached to the driving section of the crank shaft is a bevel pinion 16 in mesh with a bevel pinion 17 fixed to the end of the driven shaft 18, as is usual in motor cycle construction.

The crank-pin 10 is lubricated by the splashing of the oil which is placed in the casing, and this oil further serves to lubricate the friction clutch to prevent the cutting and undue wearing of the friction plate, for which purpose the body of the fly-wheel section 9 and the friction plate 12 are provided with a number of oil openings 19 arranged about the inwardly-projecting portion of the clutch, whereby the oil running to the center of the crank shaft will pass into these openings.

In Fig. 2 a modification of the invention is shown, which is in substance the same as that form of the invention disclosed in Fig. 1, with the exception of the particular form of the friction clutch; the same instead of being inwardly dished is made substantially flat, with the oil openings 19ª, corresponding to the oil openings 19, arranged approximately parallel to the driving shaft instead of extending slightly radially of the fly-wheel, as in Fig. 1.

The nuts on the bolts 15 are adjusted to make the friction clutch of the desired stiffness, so that under ordinary circumstances the fly-wheel and driving portion of the crank shaft will travel together. When, however, the engine is first started or the load is substantially increased, as in climbing a hill, the clutch will allow the fly-wheel to slip slightly relatively to the driving shaft at the instant of each explosion of the engine and thus relieve the motor cycle of shock and unnecessary strain on the working parts.

Having thus described my invention, I claim as new and desire to secure by Letters Patent:

1. The combination of an explosive engine crank-case, a driving shaft journaled in the crank-case, a driven shaft operatively connected to the driving shaft, and a friction clutch arranged in the crank-case in the length of the driving shaft between the crank thereof and the driving shaft to permit of the crank slipping relatively to the driving portion of the driving shaft at the instant of explosion when the engine is first started, or when the load is increased beyond certain limits.

2. The combination of an explosive engine crank case, a crank shaft having a crank, and a friction clutch arranged between the crank and shaft and arranged in the case to relieve the shaft of shock caused by the impetus of the explosion.

3. The combination of an explosive engine crank case, a crank shaft constructed of two sections, a fly-wheel of two sections spaced apart, with one of the sections of the fly-wheel rigid with one section of the crank shaft and the other section of the fly-wheel journaled on the crank shaft, means to frictionally bind the journaled section of the fly-wheel to that section of the crank shaft by which it is carried, and a crank-pin connecting the two sections of the fly-wheel together.

4. The combination of an explosive engine crank case, a driving shaft constructed of two sections, a fly-wheel of two sections spaced apart, with one of the sections of the fly-wheel rigid with one of the sections of the driving shaft, and the other section of the fly-wheel journaled on the other section of the driving shaft, a friction disk rigid with that section of the driving shaft on which the fly-wheel section is journaled, a friction plate interposed between the body of the fly-wheel and friction plate, and an annular clamping plate bearing on the friction disk and clamped to the fly-wheel.

5. The combination of an explosive engine crank case, a crank shaft having a friction disk rigid therewith, a fly-wheel carried on the shaft within the case and having a crank pin, a friction plate interposed between the friction disk and body of the fly-wheel, and means binding the wheel and friction disk together.

6. The combination of an explosive engine crank case, a crank shaft having a friction disk rigid therewith, a fly-wheel carried on the shaft, constructed of two half sections spaced apart, a crank pin rigidly connecting the two sections of the fly-wheel together, one of said sections of the fly-wheel having lubricating openings, a friction plate interposed between the friction disk and that section of the wheel provided with the lubricating opening, and means binding the section of the wheel having the lubricating opening, to the friction disk.

In testimony whereof I have signed my name to this specification in the presence of two subscribing witnesses.

JACOB R. SPANGLER.

Witnesses:
  OTTO G. DE WALD,
  CONRAD D. HORSTING.